United States Patent
Utsumi et al.

(10) Patent No.: US 11,736,629 B2
(45) Date of Patent: Aug. 22, 2023

(54) MOBILE TERMINAL CAPABLE OF INSTRUCTING TRANSMISSION OF FAX, IMAGE FORMING APPARATUS, METHODS OF CONTROLLING MOBILE TERMINAL AND IMAGE FORMING APPARATUS, COMMUNICATION SYSTEM, AND STORAGE MEDIUM

(71) Applicant: CANON KABUSHIKI KAISHA, Tokyo (JP)

(72) Inventors: Yuichi Utsumi, Yokohama (JP); Kazuhiro Oyoshi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/540,628

(22) Filed: Dec. 2, 2021

(65) Prior Publication Data

US 2022/0094797 A1  Mar. 24, 2022

Related U.S. Application Data

(63) Continuation of application No. 15/204,031, filed on Jul. 7, 2016, now Pat. No. 11,336,776, which is a
(Continued)

(30) Foreign Application Priority Data

Jun. 19, 2013 (JP) .................................. 2013-128529

(51) Int. Cl.
*H04N 1/00* (2006.01)

(52) U.S. Cl.
CPC ..... *H04N 1/00209* (2013.01); *H04N 1/00106* (2013.01); *H04N 1/00114* (2013.01);
(Continued)

(58) Field of Classification Search
USPC ................ 358/1.15, 1.1; 346/107.3; 709/247
See application file for complete search history.

(56) References Cited

U.S. PATENT DOCUMENTS

| | | | | | |
|---|---|---|---|---|---|
| 4,875,104 | A | * | 10/1989 | Kamon | H04N 1/33315 358/474 |
| 5,223,904 | A | * | 6/1993 | Umezawa | G03G 15/607 399/376 |

(Continued)

FOREIGN PATENT DOCUMENTS

| JP | H07288671 A | 10/1995 |
|---|---|---|
| JP | H1042069 A | 2/1998 |

(Continued)

OTHER PUBLICATIONS

Non-Final Office Action issued in U.S. Appl. No. 14/305,162 dated Apr. 10, 2015.
(Continued)

*Primary Examiner* — Marcus T Riley
(74) *Attorney, Agent, or Firm* — Rossi, Kimms & McDowell LLP

(57) ABSTRACT

A mobile terminal improved in operability concerning fax transmission. A CPU of the mobile terminal sets information indicative of a fax transmission destination, sets reading and transmission information concerning fax transmission and original reading, and sends a request for fax transmission, to an image forming apparatus. When a response notifying capability of fax transmission is received from the apparatus, the CPU causes a message for prompting a user to set an original, to be displayed on a display section. When the original has been set and an instruction for fax transmission from the user is received, the CPU sends an instruction for reading the original and executing fax transmission, together with the transmission destination information, and the reading and transmission information, to the apparatus. The CPU
(Continued)

causes a result of fax transmission by the apparatus to be displayed on the display section.

35 Claims, 13 Drawing Sheets

Related U.S. Application Data continuation of application No. 14/305,162, filed on Jun. 16, 2014, now Pat. No. 9,413,905.

(52) U.S. Cl.
CPC ..... *H04N 1/00307* (2013.01); *H04N 1/00477* (2013.01); *H04N 2201/006* (2013.01); *H04N 2201/0018* (2013.01); *H04N 2201/0072* (2013.01); *H04N 2201/0075* (2013.01); *H04N 2201/0094* (2013.01); *H04N 2201/3204* (2013.01); *H04N 2201/3273* (2013.01)

(56) References Cited

U.S. PATENT DOCUMENTS

| | | | |
|---|---|---|---|
| 5,956,681 A * | 9/1999 | Yamakita | G10L 15/26 704/235 |
| 6,072,595 A | 6/2000 | Yoshiura | |
| 7,532,716 B2 * | 5/2009 | Otsuka | H04M 1/72412 379/93.07 |
| 7,898,680 B2 * | 3/2011 | Misawa | G06F 3/1236 358/1.9 |
| 9,148,543 B2 | 9/2015 | Sugino | |
| 9,329,816 B2 | 5/2016 | Berarducci | |
| 9,413,905 B2 * | 8/2016 | Utsumi | H04N 1/00307 |
| 9,606,762 B2 | 3/2017 | Oishi | |
| 9,665,317 B2 | 5/2017 | Yokoyama | |
| 9,736,624 B2 | 8/2017 | Amano | |
| 9,769,336 B2 * | 9/2017 | Aritomi | H04N 1/00307 |
| 10,282,153 B2 * | 5/2019 | Suzuki | G06F 13/385 |
| 10,397,963 B2 * | 8/2019 | Ito | H04W 88/06 |
| 10,447,870 B2 * | 10/2019 | Naito | H04N 1/32117 |
| 10,659,628 B2 * | 5/2020 | Yamauchi | H04W 4/80 |
| 10,972,617 B2 * | 4/2021 | Naito | H04W 36/14 |
| 11,336,776 B2 * | 5/2022 | Utsumi | H04N 1/00307 |
| 11,431,857 B2 * | 8/2022 | Naito | H04L 51/42 |
| 2004/0114197 A1 * | 6/2004 | Sheng | H04N 1/00397 358/474 |
| 2006/0044601 A1 * | 3/2006 | Misawa | G06F 3/1236 358/1.15 |
| 2006/0251224 A1 * | 11/2006 | Fukumizu | G06F 21/42 379/93.01 |
| 2008/0007789 A1 * | 1/2008 | La | H04N 1/4413 358/400 |
| 2009/0103124 A1 * | 4/2009 | Kimura | G06F 3/1292 358/1.15 |
| 2009/0136242 A1 * | 5/2009 | Okamoto | G03G 21/20 399/13 |
| 2009/0244650 A1 * | 10/2009 | Matsuo | H04N 1/00482 358/474 |
| 2010/0039661 A1 * | 2/2010 | Stephenson | H04N 1/00212 358/1.15 |
| 2010/0208297 A1 * | 8/2010 | Takamiya | H04N 1/00225 358/1.15 |
| 2010/0214590 A1 * | 8/2010 | Ray | H04N 1/32112 358/1.14 |
| 2011/0312380 A1 * | 12/2011 | Bard | H04N 1/00106 358/442 |
| 2012/0075672 A1 * | 3/2012 | Oishi | G06F 3/1204 358/1.15 |
| 2013/0120794 A1 * | 5/2013 | Kamoi | G06K 15/1822 358/1.15 |
| 2013/0215467 A1 | 8/2013 | Fein | |
| 2013/0229687 A1 * | 9/2013 | Yamauchi | G06F 3/1267 358/1.15 |
| 2014/0355057 A1 | 12/2014 | Jang | |
| 2014/0355063 A1 | 12/2014 | Jang | |
| 2014/0368867 A1 | 12/2014 | Kim | |
| 2014/0376044 A1 * | 12/2014 | Utsumi | H04N 1/00307 358/1.15 |
| 2014/0376045 A1 * | 12/2014 | Oyoshi | H04N 1/00307 358/1.15 |
| 2015/0055174 A1 | 2/2015 | Baba | |
| 2015/0092233 A1 | 4/2015 | Park | |
| 2015/0138597 A1 | 5/2015 | Koshigaya | |
| 2016/0301815 A1 * | 10/2016 | Aritomi | H04N 1/00307 |
| 2016/0316077 A1 * | 10/2016 | Utsumi | H04N 1/00114 |
| 2017/0264758 A1 * | 9/2017 | Naito | H04W 12/50 |
| 2017/0290071 A1 * | 10/2017 | Ito | H04W 76/14 |
| 2019/0387109 A1 * | 12/2019 | Naito | H04W 12/50 |
| 2021/0176369 A1 * | 6/2021 | Naito | H04N 1/00315 |
| 2022/0094797 A1 * | 3/2022 | Utsumi | H04N 1/00477 |

FOREIGN PATENT DOCUMENTS

| | | |
|---|---|---|
| JP | H1065864 A | 3/1998 |
| JP | 2003319093 A | 11/2003 |
| JP | 2005277794 A | 10/2005 |
| JP | 2006163791 A | 6/2006 |
| JP | 2007079639 A | 3/2007 |
| JP | 2007166230 A | 6/2007 |
| JP | 2009147901 A | 7/2009 |
| JP | 2010241114 A | 10/2010 |
| JP | 2011087280 A | 4/2011 |
| JP | 2012119003 A | 6/2012 |
| JP | 2013084227 A | 5/2013 |
| JP | 2013121053 A | 6/2013 |

OTHER PUBLICATIONS

Final Office Action issued in U.S. Appl. No. 14/305,162 dated Aug. 25, 2015.
Non-Final Office Action issued in U.S. Appl. No. 14/305,162 dated Dec. 1, 2015.
Notice of Allowance issued in U.S. Appl. No. 14/305,162 dated Apr. 4, 2016.
Office Action issued in Japanese Patent Application No. 2013-128529 dated Jul. 25, 2017.
Office Action issued in Japanese Appln. No. 2019-002016 dated Nov. 26, 2019.
Office Action issued in Japanese Appln. No. 2019-002016 dated Mar. 10, 2020.
Office Action issued in U.S. Appl. No. 15/204,031 dated Sep. 7, 2017.
Office Action issued in U.S. Appl. No. 15/204,031 dated Apr. 24, 2018.
Office Action issued in U.S. Appl. No. 15/204,031 dated Sep. 17, 2018.
Office Action issued in U.S. Appl. No. 15/204,031 dated Mar. 1, 2019.
Notice of Allowance issued in U.S. Appl. No. 15/204,031 dated Jul. 24, 2019.
Office Action issued in U.S. Appl. No. 15/204,031 dated Nov. 29, 2019.
Office Action issued in U.S. Appl. No. 15/204,031 dated Jun. 8, 2020.
Office Action issued in U.S. Appl. No. 15/204,031 dated Feb. 11, 2021.
Notice of Allowance issued in U.S. Appl. No. 15/204,031 dated Sep. 9, 2021.
Notice of Allowance issued in U.S. Appl. No. 15/204,031 dated Jan. 21, 2022.

* cited by examiner

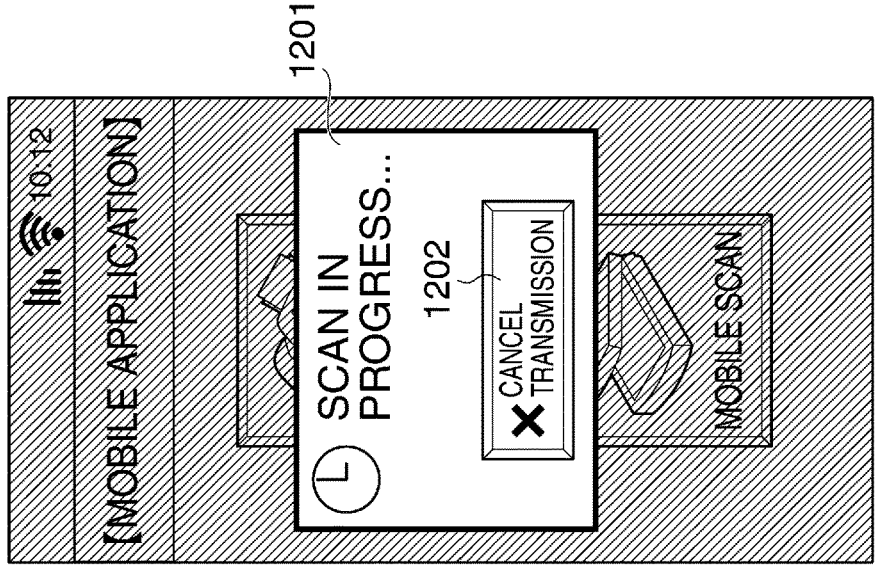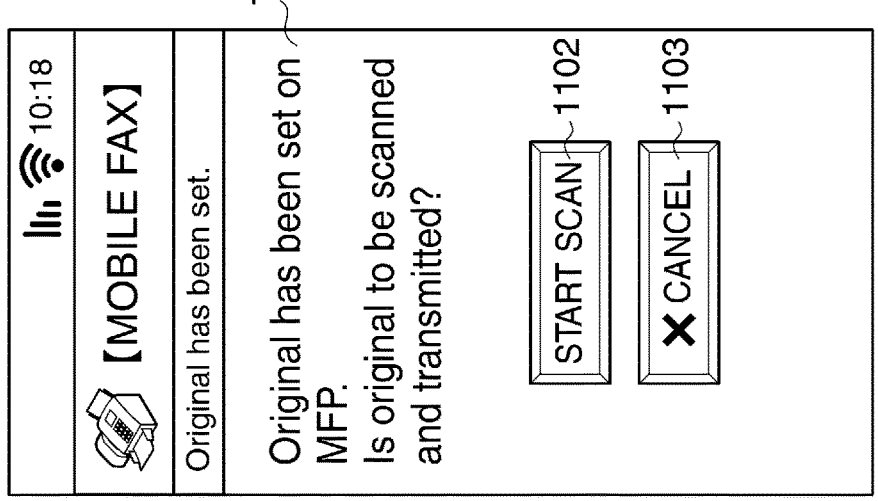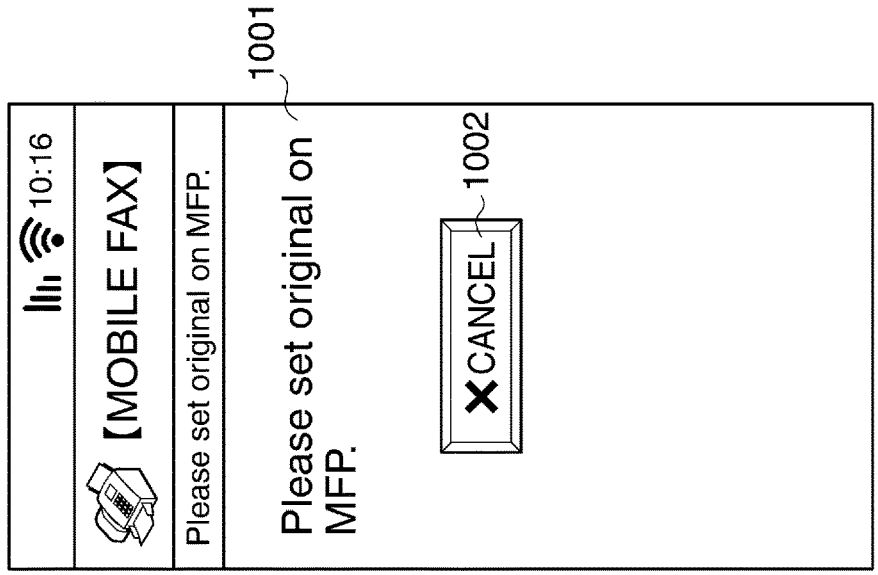

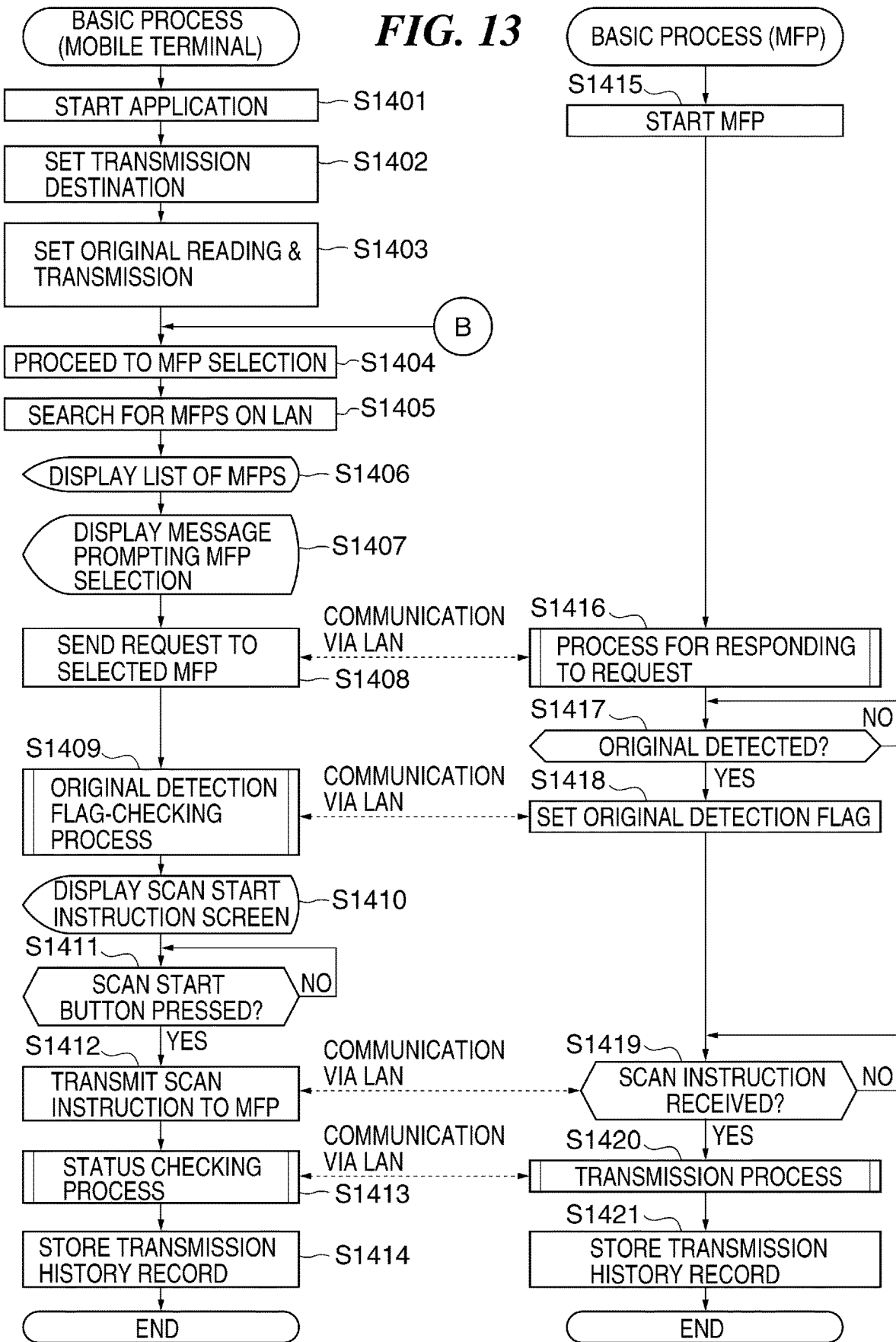

MOBILE TERMINAL CAPABLE OF INSTRUCTING TRANSMISSION OF FAX, IMAGE FORMING APPARATUS, METHODS OF CONTROLLING MOBILE TERMINAL AND IMAGE FORMING APPARATUS, COMMUNICATION SYSTEM, AND STORAGE MEDIUM

BACKGROUND OF THE INVENTION

Field of the Invention

The present invention relates to a mobile terminal that is capable of instructing transmission of a fax document, an image forming apparatus, methods of controlling the mobile terminal and the image forming apparatus, a communication system, and a storage medium.

Description of the Related Art

In recent years, mobile terminals excellent in carryability and operability, which are equipped with a large-sized display and a touch panel, such as smartphones, tablet PCs, and PDAs, have come into widespread use. These mobile terminals incorporate a telephone directory, in which a plurality of information items, such as a home phone number, a mobile phone number, and a company's fax number, can be registered with respect to each person's name.

There has been disclosed a technique for using, when performing fax transmission by an MFP (multifunction peripheral), information stored in such a mobile terminal, with reduced burden on each user (Japanese Patent Laid-Open Publication No. 2003-319093).

Japanese Patent Laid-Open Publication No. 2003-319093 shows a communication system configured such that a contact in a contact list stored in a mobile terminal is transmitted to an MFP, and the MFP analyzes information of the contact received from the mobile terminal, whereby the MFP performs fax transmission or e-mail transmission, according to the received contact. Here, the information of the contact is a telephone number, a fax number, or an e-mail address.

However, the conventional technique has a problem that the MFP, which has received the information of the contact from the mobile terminal, selects a transmission type according to a type of the information of the contact, but cannot receive detailed settings of transmission from the mobile. That is, the user has no chance to make more detailed settings of transmission.

Further, when inputting the settings of transmission from a console panel of the MFP in advance, the MFP, which is small in the display of the console panel and hence small in the amount of displayed information, is low in operability even if it were possible to make such settings.

SUMMARY OF THE INVENTION

The present invention provides a mobile terminal which is improved in operability concerning the transmission of a fax document thereby, an image forming apparatus, methods of controlling the mobile terminal and the image forming apparatus, a communication system, and a storage medium.

In a first aspect of the present invention, there is provided a mobile terminal that is capable of communicating with an image forming apparatus, comprising a transmission destination-setting unit configured to set transmission destination information indicative of a transmission destination to which a fax document is to be transmitted, a reading and transmission-setting unit configured to set reading and transmission information concerning fax transmission and reading of an original to be transmitted by fax, a request transmission unit configured to transmit a request for transmitting the fax document, to the image forming apparatus, an original setting instruction-displaying unit configured to display, on a display section, a message for prompting a user to set the original on the image forming apparatus when a response notifying that the image forming apparatus is capable of transmitting a fax document is received from the image forming apparatus to which the request has been transmitted by the request transmission unit, an instruction transmission unit configured to transmit, when it is detected that the original has been set on the image forming apparatus, and an instruction for transmitting the fax document is received from the user, an instruction for reading the original and transmitting the fax document, together with the transmission destination information set by the transmission destination-setting unit, and the reading and transmission information set by the reading and transmission-setting unit, to the image forming apparatus, and a transmission result-displaying unit configured to display a result of transmission of the fax document by the image forming apparatus, which is instructed by the instruction transmission unit, on the display section.

In a second aspect of the present invention, there is provided an image forming apparatus that is capable of communicating with a mobile terminal, comprising a request reception unit configured to receive a request for transmitting a fax document, from the mobile terminal, a response unit configured to transmit a response notifying that the image forming apparatus is capable of transmitting the fax document, to the mobile terminal, an instruction reception unit configured to receive from the mobile terminal an instruction for reading an original to be transmitted by fax and transmitting the fax document, together with transmission destination information indicative of a transmission destination to which the fax document is to be transmitted and reading and transmission information concerning fax transmission and reading of the original, a fax document transmission unit configured to read the original according to the reading and transmission information received by the instruction reception unit, and transmit the fax document representing the original to the transmission destination indicated by the transmission destination information, according to the reading and transmission information, and a status setting unit configured to set a status indicative of a result of transmission of the fax document by the fax document transmission unit.

In a third aspect of the present invention, there is provided a communication system including a mobile terminal and an image forming apparatus, in which the mobile terminal and the image forming apparatus can communicate with each other, wherein the mobile terminal comprises a transmission destination-setting unit configured to set transmission destination information indicative of a transmission destination to which a fax document is to be transmitted, a reading and transmission-setting unit configured to set reading and transmission information concerning fax transmission and reading of an original to be transmitted by fax, a request transmission unit configured to transmit a request for transmitting the fax document, to the image forming apparatus, an original setting instruction-displaying unit configured to display, on a display section, a message for prompting a user to set the original on the image forming apparatus when a response notifying that the image forming apparatus is capable of transmitting a fax document is received from the image forming apparatus to which the request has been transmitted by the request transmission unit, an instruction transmission unit configured to transmit, when it is detected that the original has been set on the image forming apparatus, and an instruction for transmitting the fax document is received from the user, an instruction for reading the original and transmitting the fax document, together with transmission destination information set by the transmission destination-setting unit, and the reading and transmission information set by the reading and transmission-setting unit, to the image forming apparatus, and a transmission result-displaying unit configured to display a result of transmission of the fax document by the image forming apparatus, which is instructed by the instruction transmission unit, on the display section, and wherein the image forming apparatus comprises a request reception unit configured to receive the request for transmitting the fax document, from the mobile terminal, a response unit configured to transmit a response notifying that the image forming apparatus is capable of transmitting the fax document, to the mobile terminal, an instruction reception unit configured to receive from the mobile terminal the instruction for reading the original and transmitting the fax document, together with the transmission destination information and the reading and transmission information, a fax document transmission unit configured to read the original according to the reading and transmission information received by the instruction reception unit, and transmit the fax document representing the original to the transmission destination indicated by the transmission destination information, according to the reading and transmission information, and a status setting unit configured to set a status indicative of a result of transmission of the fax document by the fax document transmission unit.

In a fourth aspect of the present invention, there is provided a method of controlling a mobile terminal that is capable of communicating with an image forming apparatus, comprising setting transmission destination information indicative of a transmission destination to which a fax document is to be transmitted, setting reading and transmission information concerning fax transmission and reading of an original to be transmitted by fax, transmitting a request for transmitting the fax document, to the image forming apparatus, displaying a message for prompting a user to set the original on the image forming apparatus when a response notifying that the image forming apparatus is capable of transmitting a fax document is received from the image forming apparatus to which the request has been transmitted by transmitting, transmitting, when it is detected that the original has been set on the image forming apparatus, and an instruction for transmitting the fax document is received from the user, an instruction for reading the original and transmitting the fax document, together with transmission destination information set by said first-mentioned setting, and the reading and transmission information set by said second-mentioned setting, to the image forming apparatus, and displaying a result of transmission of the fax document by the image forming apparatus, which is instructed by said second-mentioned transmitting, on the display section.

In a fifth aspect of the present invention, there is provided a method of controlling an image forming apparatus that is capable of communicating with a mobile terminal, comprising receiving a request for transmitting a fax document, from the mobile terminal, transmitting a response notifying that the image forming apparatus is capable of transmitting the fax document, to the mobile terminal, receiving from the mobile terminal an instruction for reading an original to be transmitted by fax and transmitting the fax document, together with transmission destination information indicative of a transmission destination to which the fax document is to be transmitted, and reading and transmission information concerning fax transmission and reading of the original, reading the original according to the reading and transmission information received by said second-mentioned receiving, and transmitting the fax document representing the original to the transmission destination indicated by the transmission destination information, according to the reading and transmission information, and setting a status indicative of a result of transmission of the fax document by said transmitting.

In a sixth aspect of the present invention, there is provided a non-transitory computer-readable storage medium storing a computer-executable program for executing a method of controlling a mobile terminal that is capable of communicating with an image forming apparatus, wherein the method comprises setting transmission destination information indicative of a transmission destination to which a fax document is to be transmitted, setting reading and transmission information concerning fax transmission and reading of an original to be transmitted by fax, transmitting a request for transmitting the fax document, to the image forming apparatus, displaying a message for prompting a user to set the original on the image forming apparatus when a response notifying that the image forming apparatus is capable of transmitting a fax document is received from the image forming apparatus to which the request has been transmitted by transmitting, transmitting, when it is detected that the original has been set on the image forming apparatus, and an instruction for transmitting the fax document is received from the user, an instruction for reading the original and transmitting the fax document, together with transmission destination information set by said first-mentioned setting, and the reading and transmission information set by said second-mentioned setting, to the image forming apparatus, and displaying a result of transmission of the fax document by the image forming apparatus, which is instructed by said second-mentioned transmitting, on the display section.

In a seventh aspect of the present invention, there is provided a non-transitory computer-readable storage medium storing a computer-executable program for executing a method of controlling an image forming apparatus that is capable of communicating with a mobile terminal, wherein the method comprises receiving a request for transmitting a fax document, from the mobile terminal, transmitting a response notifying that the image forming apparatus is capable of transmitting the fax document, to the mobile terminal, receiving from the mobile terminal an instruction for reading an original to be transmitted by fax and transmitting the fax document, together with transmission destination information indicative of a transmission destination to which the fax document is to be transmitted, and reading and transmission information concerning fax transmission and reading of the original, reading the original according to the reading and transmission information received by said second-mentioned receiving, and transmitting the fax document representing the original to the transmission destination indicated by the transmission destination information, according to the reading and transmission information, and setting a status indicative of a result of transmission of the fax document by said transmitting.

According to the present invention, it is possible to set reading and transmission information concerning fax transmission and reading of an original to be transmitted by fax, and therefore it is possible to improve operability of the mobile terminal for transmission of the fax document.

Further features of the present invention will become apparent from the following description of exemplary embodiments (with reference to the attached drawings).

BRIEF DESCRIPTION OF THE DRAWINGS

FIGS. 4A to 4C are diagrams showing examples of screens of the mobile terminal appearing in FIG. 1.

FIGS. 6A to 6C are diagrams showing examples of screens displayed by the mobile fax application.

FIG. 13 is a flowchart of a variation of the basic process shown in FIG. 7, which is executed by the MFP and the mobile terminal without using an NFC function.

DESCRIPTION OF THE EMBODIMENTS

The present invention will now be described in detail below with reference to the accompanying drawings showing embodiments thereof.

Figure 1:
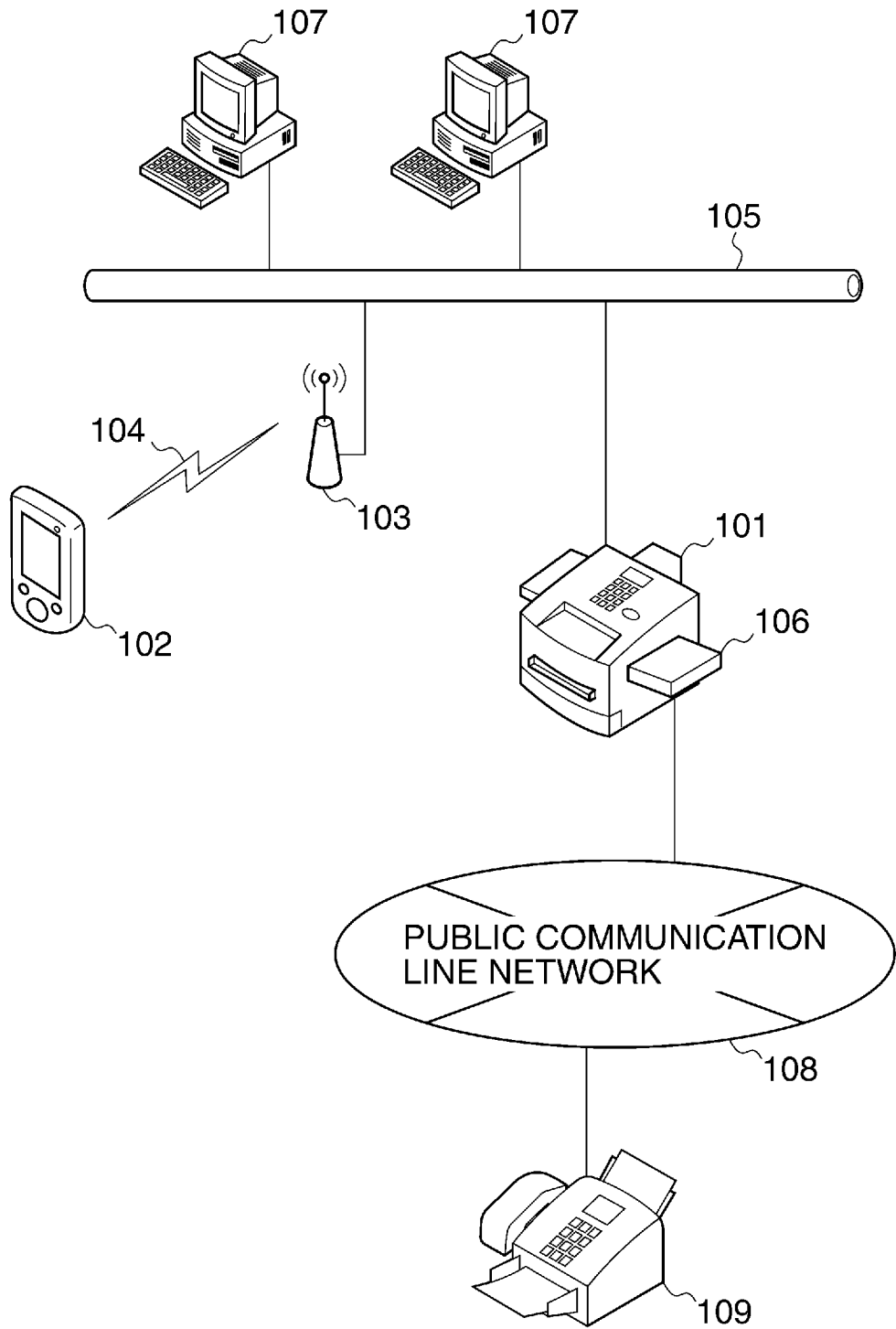
FIG. 1 is a schematic diagram of a communication system according to an embodiment of the present invention.

FIG. 1 is a schematic diagram of a communication system 100 according to an embodiment of the present invention.

Referring to FIG. 1, the communication system 100 comprises an MFP (multifunction peripheral) 101 as an image forming apparatus, a mobile terminal 102, and PCs (personal computers) 107, which are connected via a network (wired LAN) 105. The mobile terminal 102 is connected to the network 105 by a wireless LAN 104 via an access point 103 provided on the network 105.

Further, the MFP 101 is provided with an NFC (near field communication) tag 106, which makes it possible to communicate with an NFC function-equipped device. Further, the MFP 101 has an interface with a public communication line network 108, which makes it possible to perform fax transmission and reception to and from a facsimile machine 109 connected via the public communication line network 108.

In the present embodiment, the MFP 101 and the mobile terminal 102 can communicate with each other via the wireless LAN 104 and the network 105, and operate in cooperation with each other.

Although in FIG. 1, the MFP 101 is connected to the network 105 via wired connection, the MFP 101 may be wirelessly connected to the network 105. In this case, the MFP 101 is connected to the network 105 via the access point 103.

Figure 2:
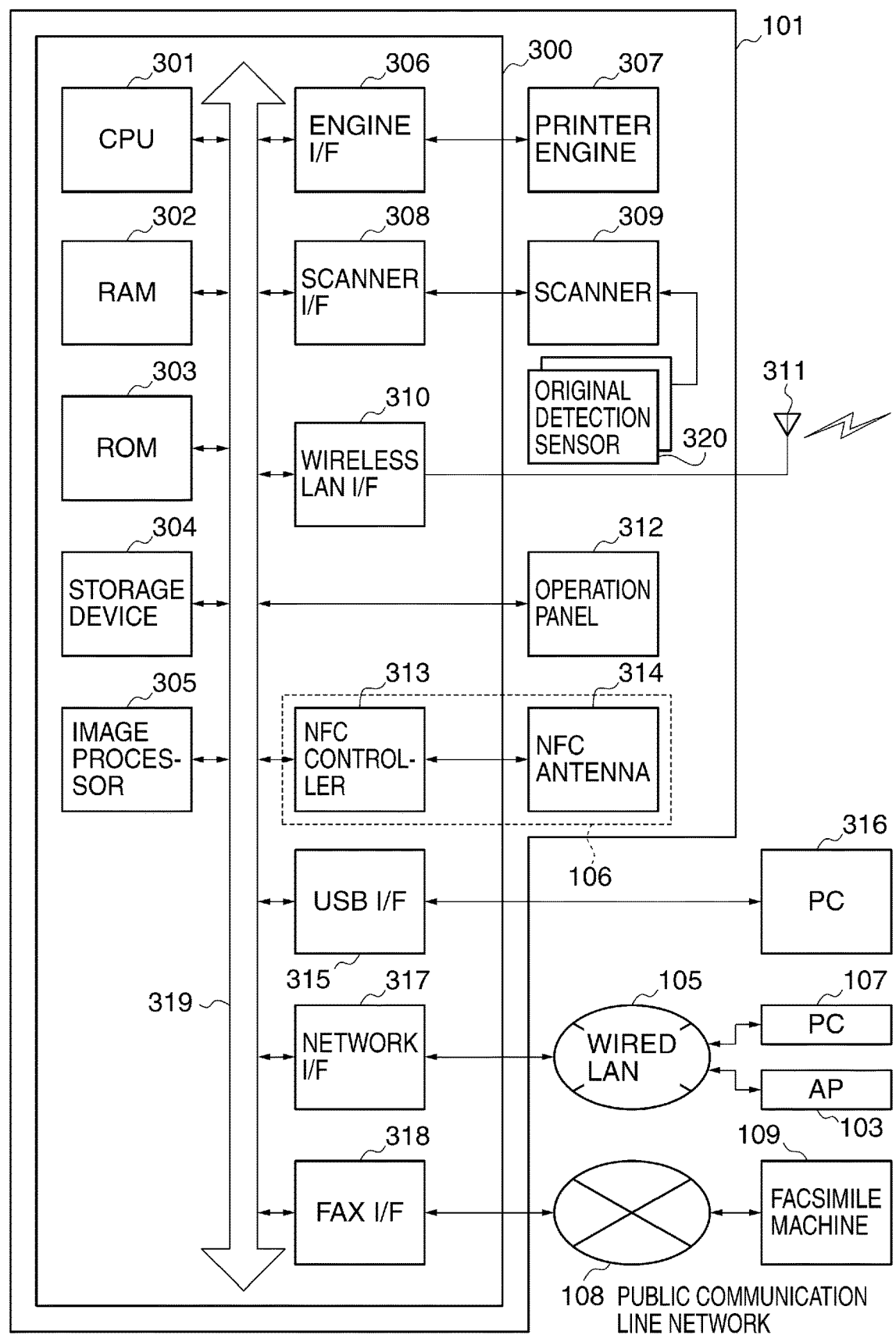
FIG. 2 is a schematic block diagram of an MFP appearing in FIG. 1.

FIG. 2 is a schematic block diagram of the MFP 101 appearing in FIG. 1.

Referring to FIG. 2, the MFP 101 comprises a controller board 300, a scanner 309, a printer engine 307, a console panel 312, and an NFC antenna 314.

Of these, the scanner 309 reads an original, the printer engine 307 prints print data on a sheet, and the console panel 312 receives inputs of various setting operations and displays an alarm etc.

Further, an original detection sensor 320 for detecting an original is connected to the scanner 309. The original detection sensor 320 includes a platen part and an ADF (automatic document feeder) part.

In the case of the platen part of the original detection sensor 320, when an original is placed on an original platen glass, not shown, of the scanner 309, it detects the placed original, and notifies the scanner 309 of the detection result. In the case of the ADF part of the original detection sensor 320, when an original is placed on a document feeder, not shown of the scanner 309, it detects the placed original, and notifies the scanner 309 of the detection result.

A CPU 301 of the controller board 300 controls the overall operation of the MFP 101. A ROM 303 is a boot ROM storing a boot program of the MFP 101.

A RAM 302 is a system work memory used for operation of the CPU 301, which stores calculation data calculated by the CPU 301 and various programs executed by the same. Further, the RAM 302 is also used as an image memory for storing image data on which various image processing has been performed by an image processor 305 during printing or the like.

A storage device 304 is a non-volatile secondary storage device for storing large-sized programs and data, and the stored large-sized programs and data are used by being loaded into the RAM 302.

A scanner interface 308 is an interface for performing data communication with the scanner 309. An engine interface 306 is an interface for performing data communication with the printer engine 307.

A fax interface 318 is connected to the public communication line network 108 via a modular jack, not shown, and performs fax transmission and reception to and from the facsimile machine 109.

A network interface 317 is connected to the network 105 via a LAN interface connector, and performs network communication with the PCs 107 and the mobile terminal 102. In a case where the MFP 101 is wirelessly connected as mentioned above, a wireless LAN interface 310 performs network communication with the PCs 107, the access point 103, and the mobile terminal 102 via a wireless LAN antenna 311.

A USB interface 315 performs USB communication with other devices via a USB connector, not shown. In FIG. 2, the USB interface 315 is locally connected to a PC 316.

An NFC controller 313 performs NFC communication with a mobile terminal equipped with the NFC function via the NFC antenna 314.

The above-described sections and console panel 312 of the controller board 300 are connected to each other via a bus 319.

Figure 3:
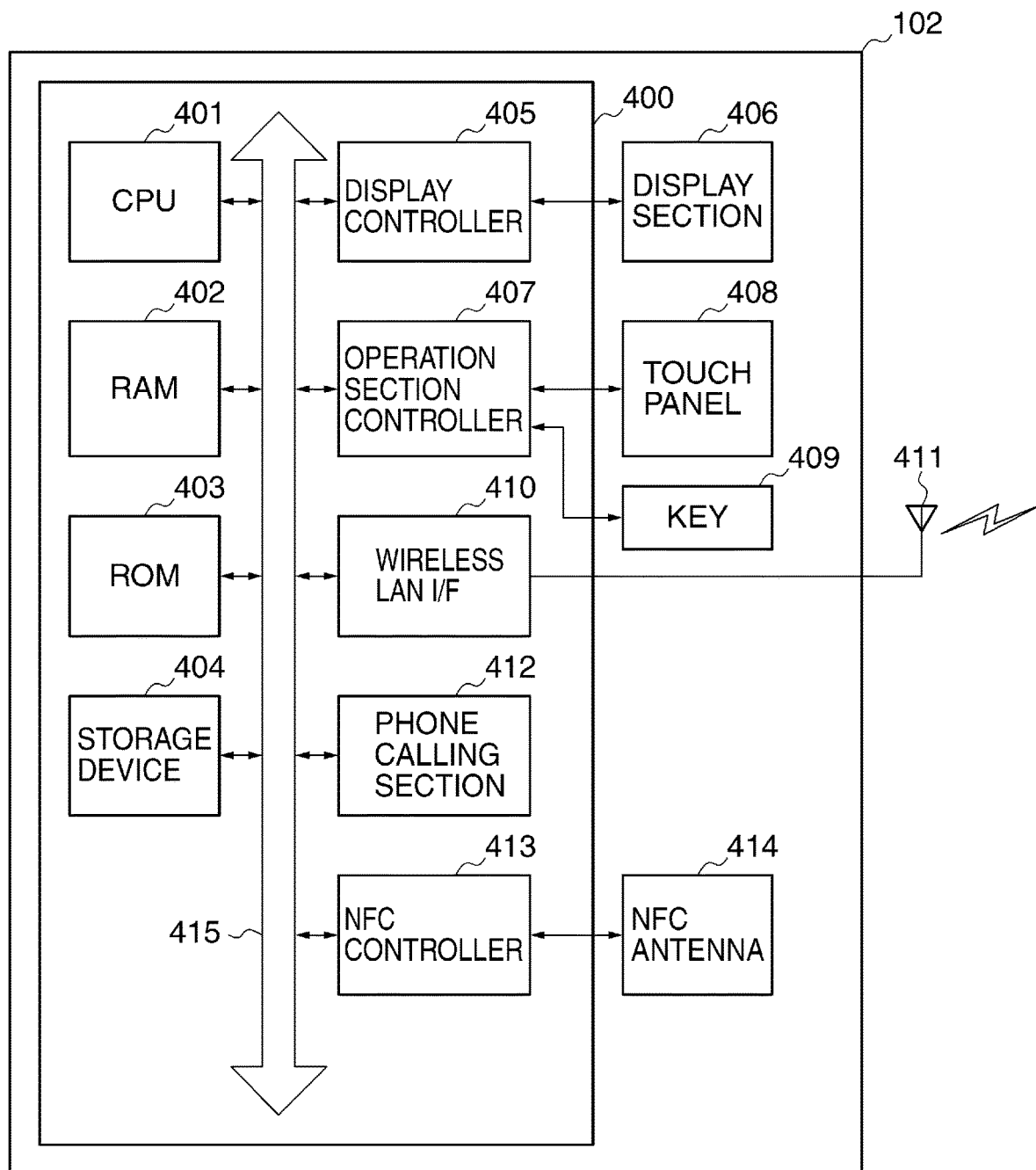
FIG. 3 is a schematic block diagram of a mobile terminal appearing in FIG. 1.

FIG. 3 is a schematic block diagram of the mobile terminal 102 appearing in FIG. 1.

Referring to FIG. 3, the mobile terminal 102 comprises a controller board 400, a display section 406, a touch panel 408, keys 409, and an NFC antenna 414.

Various information is displayed on the display section 406 by a display controller 405, and an operation section controller 407 performs various control with respect to the touch panel 408 and the keys 409. A user can give instructions for menu scroll and button pressing, with respect to menus and buttons displayed on the display section 406, by sliding and touching the touch panel 408 with his/her finger.

A CPU 401 of the controller board 400 controls the overall operation of the mobile terminal 102. A ROM 403 is a boot ROM storing a boot program of the mobile terminal 102.

A RAM 402 is a system work memory used for operation of the CPU 401, which stores calculation data calculated by the CPU 401 and various programs executed by the same. A storage device 404 is a non-volatile secondary storage device for storing large-sized programs and data, and the stored large-sized programs and data are used by being loaded into the RAM 402.

A wireless LAN interface 410 is connected to the access point 103 by wireless LAN via a wireless LAN antenna 411 to perform wireless LAN communication with external devices. A phone calling section 412 is connected to a microphone and a speaker, neither of which is shown, and is connected to the public communication line to provide a function as a telephone. An NFC controller 413 performs NFC communication with a device equipped with the NFC function via the NFC antenna 414.

The above-described sections of the controller board 400 are connected to each other via a bus 415.

Although in the present embodiment, a smartphone is described as an example of the mobile terminal 102, this is not limitative, but the present embodiment can also be applied to a terminal for mobile use, such as a tablet PC, in which the phone calling section 412 is excluded from the above-described configuration.

FIGS. 4A to 4C are diagrams showing examples of screens of the mobile terminal 102 appearing in FIG. 1.

FIG. 4A shows a screen of a contact list of a telephone directory application. Information of a telephone number, a mobile telephone number, a fax number, an e-mail address, and so forth can be registered, on a registered name-by-registered name basis, in the telephone directory application.

Referring to FIG. 4A, a contact list screen 501 is formed by a search input box 502 and a registered name-displaying section 503, such that the user can search for a registered name, and select a registered name from the displayed list. When a registered name is selected, contacts registered in association with the selected registered name are displayed as a list.

FIG. 4B shows an example of a displayed list of contacts (contact list). Referring to FIG. 4B, a registered name 601 indicates Takahashi Taro, and in association with this registered name, a telephone number 602, a mobile phone number 603, a fax number 604, an e-mail address 605 of the mobile phone, and an e-mail address 606 of a company are registered.

The user can select a contact from these items. When the user selects the fax number 604, a mobile fax application is started, which makes it possible to perform fax transmission in cooperation with the MFP 101.

FIG. 4C shows a top screen of an MFP cooperation application.

The top screen shown in FIG. 4C displays a mobile fax button 701 and a mobile scan button 702.

In the present embodiment, the mobile fax application in which the mobile terminal 102 and the MFP 101 perform fax transmission in cooperation with each other will be described.

FIGS. 5A to 6C are diagrams showing examples of screens displayed by the mobile fax application.

Figure 5A:
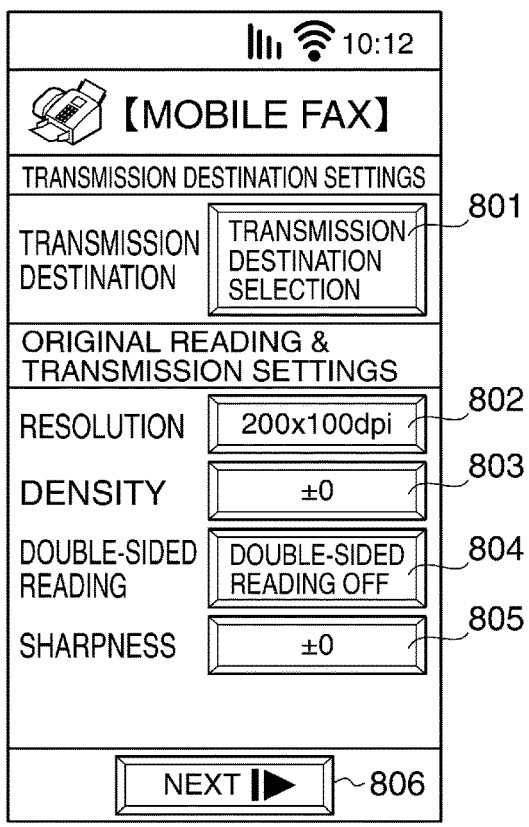
FIGS. 5A to 5D are diagrams showing examples of screens displayed by a mobile fax application.

When the user presses the mobile fax button 701 on the screen shown in FIG. 4C, a setting screen of the mobile fax application shown in FIG. 5A is displayed.

This setting screen displays items which can be set, such as a transmission destination, and each item can be set by an operation on the touch panel.

More specifically, a transmission destination selection button 801, a resolution setting button 802, a density setting button 803, a double-sided reading setting button 804, and a sharpness setting button 805 are displayed.

Figure 5B:
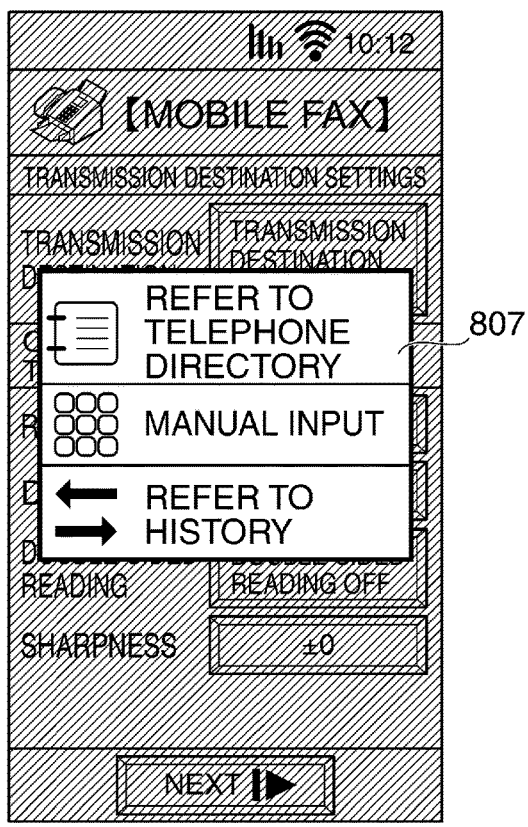

Of these, when the transmission destination selection button 801 is pressed, a transmission destination setting method selection screen shown in FIG. 5B is displayed, and this is a screen for prompting the user to select a transmission destination setting method. When the user selects a telephone directory reference button 807 on this screen, the user can select a transmission destination on the screen of the telephone directory application, shown in FIG. 4A. Further, the user can also manually set a number, or select a transmission destination by referring to history of transmission destination records.

Referring again to FIG. 5A, a candidate of resolution is displayed on the resolution setting button 802. If the user desires to change the resolution, by pressing the resolution setting button 802, the screen is changed to a screen including other candidates, and the user can select a desired resolution out of the displayed candidates.

When the user does not intend to change the resolution, the resolution is set to a setting of 200×100 dpi displayed on the resolution setting button 802. When the setting of the resolution has been changed, the changed setting is displayed on the resolution setting button 802, and the resolution is set to this setting.

The settings displayed on the density setting button 803, the double-sided reading setting button 804, and the sharpness setting button 805 can also be changed by the same operation as that of the resolution setting button 802.

Figure 5C:
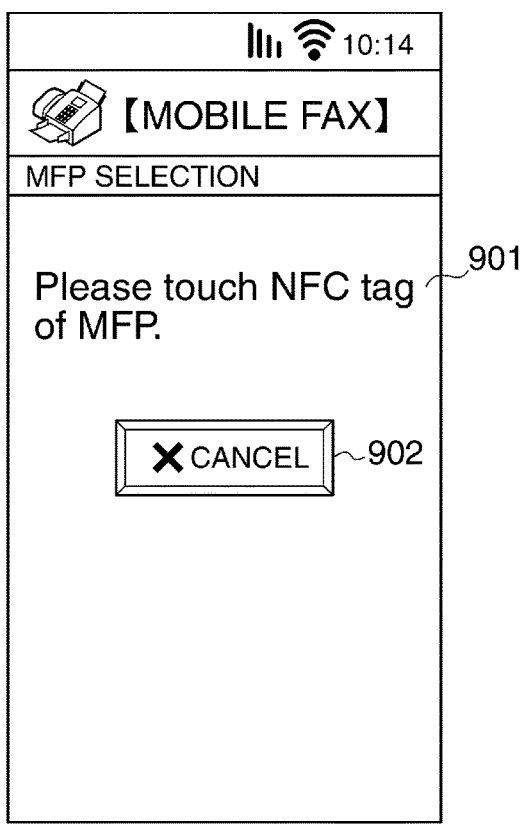

When a next button 806 is pressed, the setting items are set, and a screen shown in FIG. 5C is displayed.

FIG. 5C shows an MFP selection screen. This screen displays a display 901 of a message that prompts the user to proceed to next processing, and a cancel button 902 for canceling the processing.

Figure 5D:
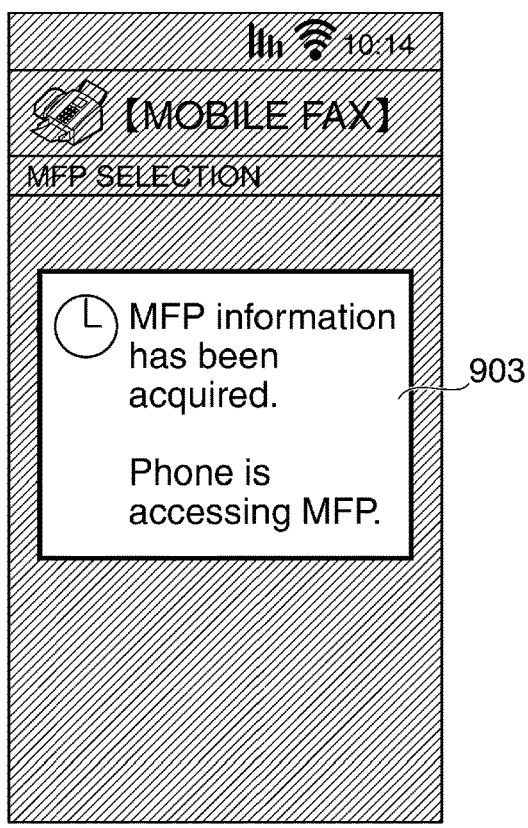

When the user touches the mobile terminal 102 against the NFC tag 106 of the MFP 101 to proceed to the next processing, a screen shown in FIG. 5D is displayed.

FIG. 5D shows an alarm display screen. This screen indicates that the MFP 101 and the mobile terminal 102 are performing preparations for cooperation.

Next, when the MFP 101 and the mobile terminal 102 are ready for cooperation, a screen shown in FIG. 6A is displayed.

FIG. 6A shows an original setting instruction screen. This is a screen for prompting the user to set an original. This screen displays a display 1001 of a message that prompts the user to proceed to next processing, and a cancel button 1002 for canceling the processing.

When an original is set on the MFP 101, a screen shown in FIG. 6B is displayed.

FIG. 6B shows a scan start instruction screen for accepting a scan start instruction by the user. This screen displays a display 1101 of a message that prompts the user to proceed to next processing, a scan start button 1102 for instructing the start of scan, and a cancel button 1103 for canceling the processing.

When the scan start button 1102 is pressed on this screen, a screen shown in FIG. 6C is displayed.

FIG. 6C shows a screen displaying the status of the MFP 101. This screen displays a display 1201 of a message indicative of the status of the MFP 101, and a transmission cancel button 1202 for instructing the MFP 101 to cancel transmission.

Figure 7:
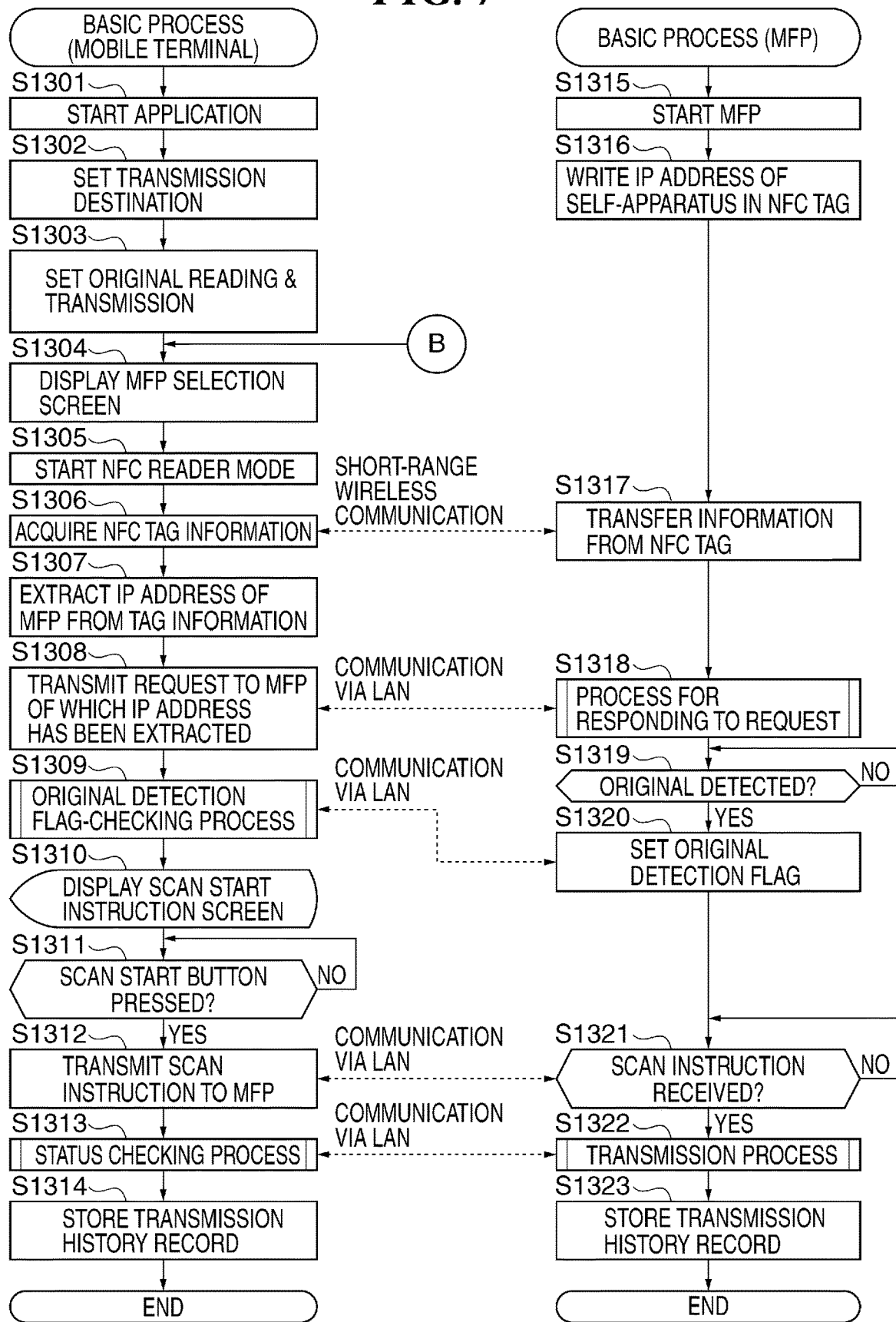
FIG. 7 is a flowchart of a basic process executed by the MFP and the mobile terminal.

FIG. 7 is a flowchart of a basic process executed by the MFP 101 and the mobile terminal 102.

Referring to FIG. 7, steps S1301 to S1314 are executed by the CPU 401 of the mobile terminal 102 according to programs stored in any of the ROM 403, the storage device 404, and the RAM 402 of the controller board 400 of the same shown in FIG. 3.

Further, steps S1315 to S1323 are executed by the CPU 301 of the MFP 101 according to programs stored in any of the ROM 303, the storage device 304, and the RAM 302 of the controller board 300 of the same shown in FIG. 2.

First, when the main power of the MFP 101 is switched on, the CPU 301 starts the MFP 101 according to a program stored in the ROM 303 of the controller board 300 (step S1315).

Next, the CPU 301 writes an IP address of the self-apparatus into the NFC tag 106 as a network address of the same (step S1316). More specifically, the CPU 301 stores the IP address of the self-apparatus e.g. in a non-volatile memory EEPROM provided in the NFC controller 313.

On the other hand, in the mobile terminal 102, the CPU 401 starts the mobile fax application so as to perform mobile facsimile transmission (step S1301).

The mobile fax application which has been started displays the setting screen shown in FIG. 5A. The user selects a transmission destination on this setting screen, whereby the transmission destination information is set (step S1302), and then original reading and transmission settings are made (step S1303). The step S1302 corresponds to the operation of a transmission destination-setting unit configured to set transmission destination information indicative of a transmission destination to which a fax document is to be transmitted. Further, the step S1303 corresponds to the operation of a reading and transmission-setting unit configured to set reading and transmission information concerning fax transmission and reading of an original to be transmitted by fax.

Further, as shown in FIG. 5A, the settings concerning the reading of a document are such that it is possible to make a setting of resolution, a setting of density, a setting of double-sided printing, and a setting of sharpness. These are shown by way of example, and the configuration may be such that at least one of them can be set, and other settings than the illustrated ones can be set.

When the next button 806 is pressed on the setting screen, the MFP selection screen shown in FIG. 5C is displayed (step S1304). A connector B appearing in FIG. 7 will be referred to hereinafter.

Then, the CPU 401 starts the NFC controller 413 of the mobile terminal 102 in a reader mode (step S1305).

To select the MFP 101 that scans an original and performs fax transmission, the user brings the mobile terminal 102 close to the NFC tag 106 of the MFP 101, whereby the mobile terminal 102 enters an NFC communicatable range.

By this operation, the MFP 101 transfers and provides an address for performing communication via the wireless LAN 104 and the network 105, which is different from short-range wireless communication (NFC) (step S1317), and the mobile terminal 102 acquires the information from the NFC tag 106 of the MFP 101 by the NFC controller 413 (step S1306). The step S1317 corresponds to the operation of an address providing unit.

Then, the CPU 401 of the mobile terminal 102 extracts the IP address of the MFP 101 from the information acquired by the NFC controller 413 (step S1307). The steps S1306 and S1307 corresponds to the operation of an address acquisition unit configured to acquire, when the mobile terminal is brought by the user close to a range communicatable with the image forming apparatus by short-range wireless communication, an address for performing communication, which is different from the short-range wireless communication, from the image forming apparatus by short-range wireless communication. Then, the mobile terminal 102 communicates with the image forming apparatus using the acquired address.

The mobile terminal 102 accesses the extracted IP address, and transmits a mobile fax request to the MFP 101 (step S1308). In doing this, if the MFP 101 is wiredly connected to the access point 103, the request is transmitted from the mobile terminal 102 to the MFP 101 via the wireless LAN interface 410, the access point 103, and the network 105. The step S1308 corresponds to the operation of a request transmission unit configured to transmit a request for transmitting the fax document, to the image forming apparatus.

On the other hand, if the MFP 101 is wirelessly connected, the request is transmitted from the mobile terminal 102 to the access point 103 via the wireless LAN interface 410, and wirelessly transmitted from the access point 103 having received the request to the MFP 101.

Upon receipt of the request, the MFP 101 executes a process for responding to the request, in which a response to the request is transmitted to the mobile terminal 102 (step S1318). The process for responding to the request will be described in detail hereinafter. Then, when an original is set on the ADF part or the platen part (YES to the step S1319), the MFP 101 sets an original detection flag (step S1320).

Upon receipt of the response to the request from the MFP 101, the mobile terminal 102 executes an original flag-checking process for checking whether or not the original detection flag has been set in the MFP 101 (step S1309). The original flag-checking process will be described in detail hereinafter.

When the original is set on the MFP 101, the CPU 401 displays the scan start instruction screen shown in FIG. 6B on the display section 406 of the mobile terminal 102 (step S1310). When the scan start button 1102 is pressed on this scan start instruction screen (YES to the step S1311), a scan instruction is transmitted to the MFP 101 (step S1312). The step S1312 corresponds to the operation of an instruction transmission unit configured to transmit, when it is detected that an original has been set on the image forming apparatus, and an instruction for transmitting a fax document (scan instruction) is received from the user, an instruction for reading the original and transmitting the fax document, together with transmission destination information and reading and transmission information, to the image forming apparatus.

Upon receipt of the scan instruction (YES to the step S1321), the MFP 101 scans the original, and executes a transmission process for performing fax transmission (step S1322). The transmission process will be described in detail hereinafter. After that, the MFP 101 stores a transmission history record according to a result of the transmission process (step S1323), followed by terminating the present process.

On the other hand, the mobile terminal 102 having transmitted the scan instruction to the MFP 101 executes a status checking process for checking whether the MFP 101 has transmitted the fax document or has terminated fax transmission with an error (step S1313). The status checking process will be described in detail hereinafter.

The mobile terminal 102 stores a transmission history record according to a result of the status checking process (step S1314), followed by terminating the present process.

Figure 8:
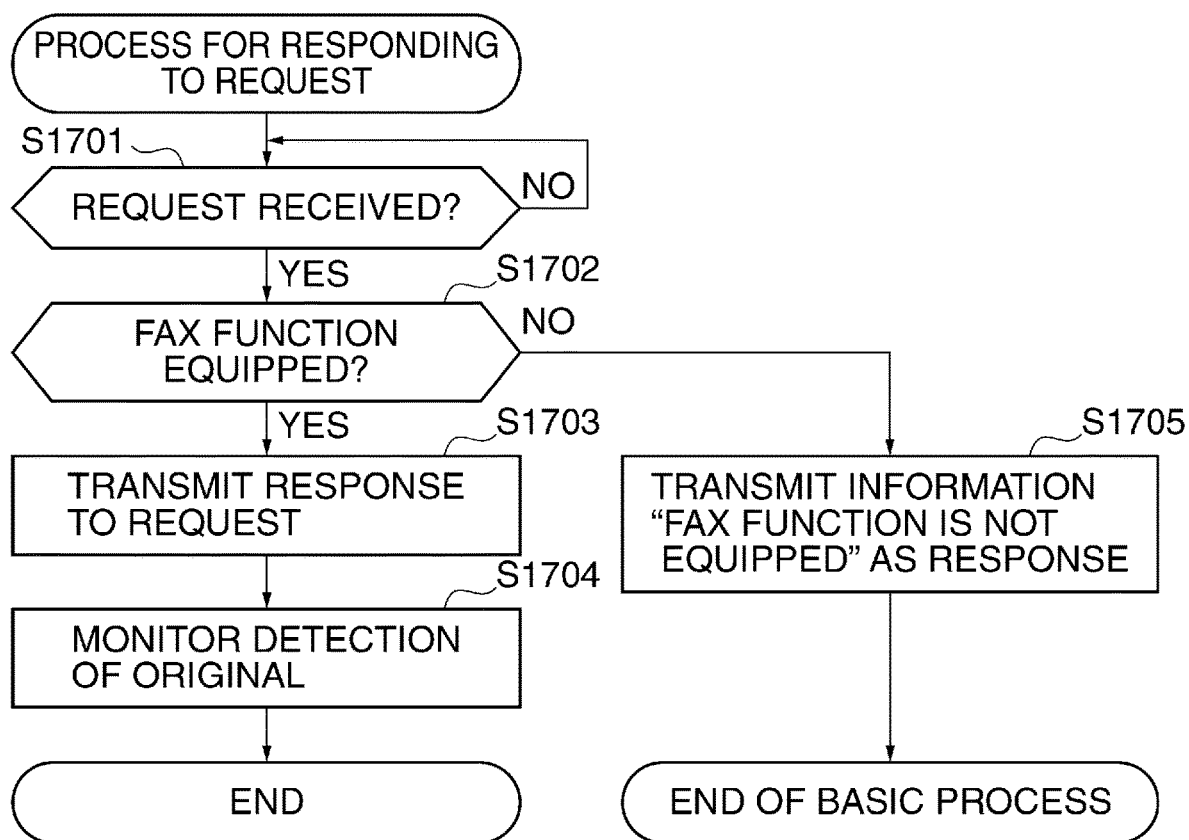
FIG. 8 is a flowchart of a process for responding to a request, which is executed in a step in FIG. 7.

FIG. 8 is a flowchart of the process for responding to a request, which is executed in the step S1318 in FIG. 7.

Referring to FIG. 8, upon receipt of a request (YES to a step S1701), the MFP 101 determines whether or not the self-apparatus is equipped with the fax function (step S1702). The step S1701 corresponds to the operation of a request reception unit configured to receive a request for transmitting a fax document, from the mobile terminal.

If it is determined in the step S1702 that the MFP 101 is equipped with the fax function (YES to the step S1702), the CPU 301 transmits a response to the received request (step S1703). The step S1703 corresponds to the operation of a response unit configured to transmit a response notifying that the image forming apparatus is capable of transmitting the fax document.

After transmitting the response, the CPU 301 starts monitoring whether or not an original is set, by the original detection sensor 320 (step S1704), followed by terminating the present process.

On the other hand, if it is determined in the step S1702 that the MFP 101 is not equipped with the fax function (NO to the step S1702), the CPU 301 transmits information indicative of absence of the mobile fax function to the mobile terminal 102 as a response (step S1705), followed by terminating the basic process shown in FIG. 7.

In the step S1703 of the above-described process for responding to a request, information on capabilities of the MFP 101 concerning fax transmission may be transmitted in combination with the response to the request, instead of merely making a response that the MFP 101 supports the mobile fax request.

More specifically, the CPU 301 transmits information on the fax transmission function which can be set to the self-apparatus, such as whether or not ECM transmission is set, alternatives of resolution, whether or not the ADF double-sided reading can be executed, to the mobile terminal 102, as a response.

Further, the mobile terminal 102 having received the information on the fax transmission function of the MFP 101 compares the settings selected by the user in advance with the settings which can be set, received from the MFP 101.

If an item which cannot be set to the MFP 101 has been set by the mobile terminal 102, the CPU 401 displays a message which requests the user to change the setting. Alternatively, the item may be automatically changed to a setting closest to the setting set by the user.

This makes it possible to cope with a case where the MFP 101 that is to actually transmit a fax document cannot be set to the settings made by the user on the mobile terminal 102 in advance.

Figure 9:
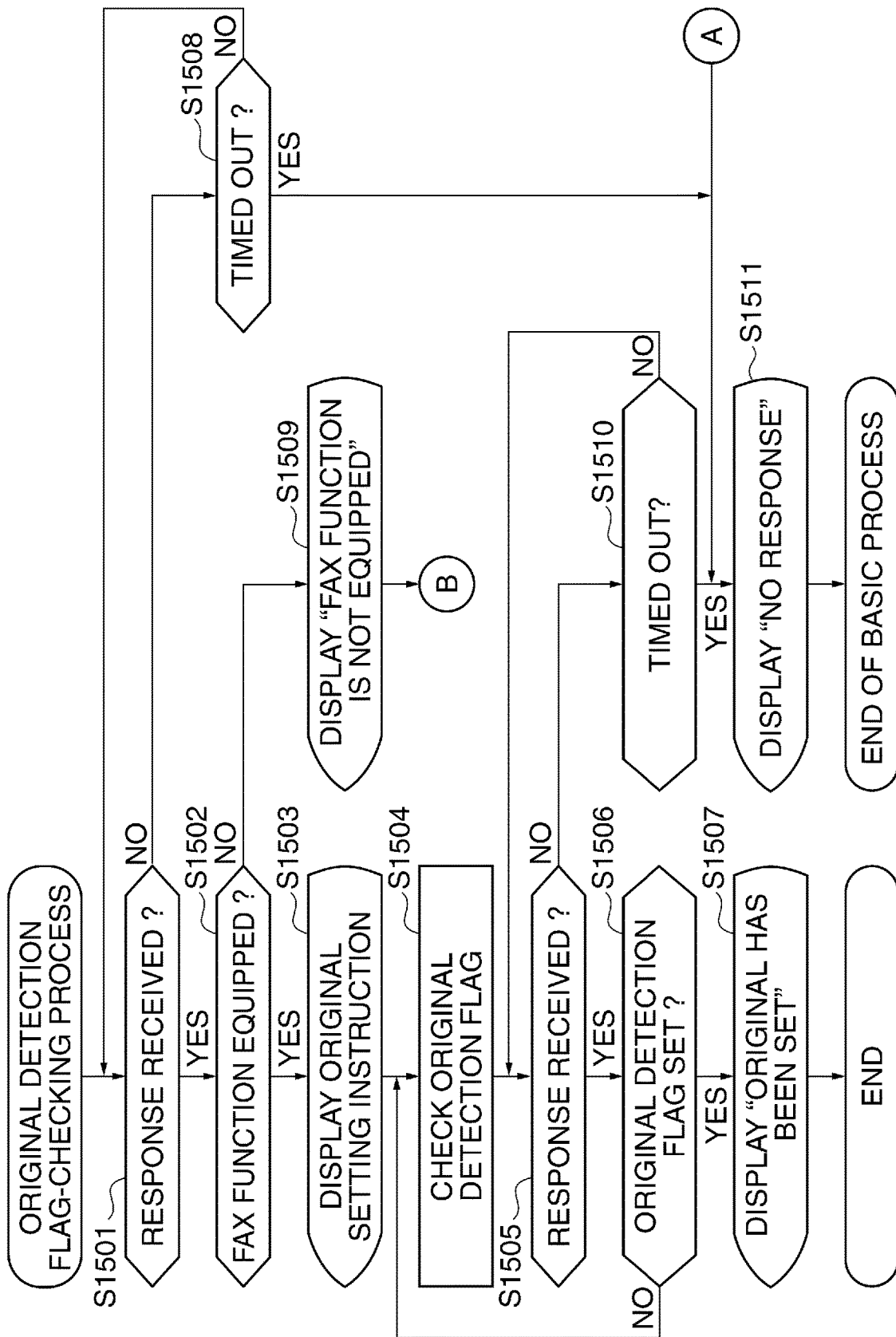
FIG. 9 is a flowchart of an original detection flag-checking process executed in a step in FIG. 7.

FIG. 9 is a flowchart of the original detection flag-checking process executed in the step S1309 in FIG. 7.

Referring to FIG. 9, the CPU 401 determines whether or not a response to the request has been received from the MFP 101 (step S1501). If it is determined in the step S1501 that a response to the request has been received from the MFP 101 (YES to the step S1501), the CPU 401 determines whether or not the MFP 101 is equipped with the fax function (step S1502).

If it is determined in the step S1502 that the MFP 101 is not equipped with the fax function (NO to the step S1502), the CPU 401 displays a message on the display section 406 of the mobile terminal 102 to the effect that the selected MFP is not equipped with the fax function (step S1509), and the CPU 401 proceeds to the step S1304 in FIG. 7 as indicated by the connector B.

On the other hand, if it is determined in the step S1502 that the MFP 101 is equipped with the fax function (YES to the step S1502), the CPU 401 displays a message shown in FIG. 6A on the display section 406 of the mobile terminal 102 for prompting the user to set an original on the MFP 101 (step S1503). The step S1503 corresponds to the operation of an original setting instruction-displaying unit configured to display, on a display section, a message for prompting a user to set the original on the image forming apparatus when a response notifying that the image forming apparatus is capable of transmitting a fax document is received from the image forming apparatus to which the request has been transmitted.

Next, to check the original detection flag, the CPU 401 performs polling for transmitting a query about the original detection flag to the MFP 101 at regular time intervals (step S1504). Then, the CPU 401 determines whether or not a response to the polling has been received (step S1505).

If it is determined in the step S1505 that a response has been received (YES to the step S1505), the CPU 401 determines whether or not the original detection flag has been set (step S1506).

If it is determined in the step S1506 that the original detection flag has not been set (NO to the step S1506), the CPU 401 returns to the step S1504.

On the other hand, if it is determined in the step S1506 that the original detection flag has been set (YES to the step S1506), the CPU 401 displays a message shown in FIG. 6B on the display section 406 of the mobile terminal 102 to the effect that an original has been set (step S1507), followed by terminating the present process.

Referring again to the step S1505, if it is determined in the step S1505 that a response has not been received (NO to the step S1505), the CPU 401 determines whether or not polling has timed out (step S1510). If it is determined in the step S1510 that the polling has not timed out (NO to the step S1510), the CPU 401 returns to the step S1505.

On the other hand, if it is determined in the step S1510 that the polling has timed out (YES to the step S1510), the CPU 401 displays a message to the effect that a response has not been received from the MFP 101 (step S1511), followed by terminating the basic process shown in FIG. 7.

Referring again to the step S1501, if it is determined in the step S1501 that a response has not been received (NO to the step S1501), the CPU 401 determines whether or not the request has timed out (step S1508). If it is determined in the step S1508 that the request has not timed out (NO to the step S1508), the CPU 401 returns to the step S1501.

On the other hand, if it is determined in the step S1508 that the request has timed out (YES to the step S1508), the CPU 401 proceeds to the step S1511.

Figure 10:
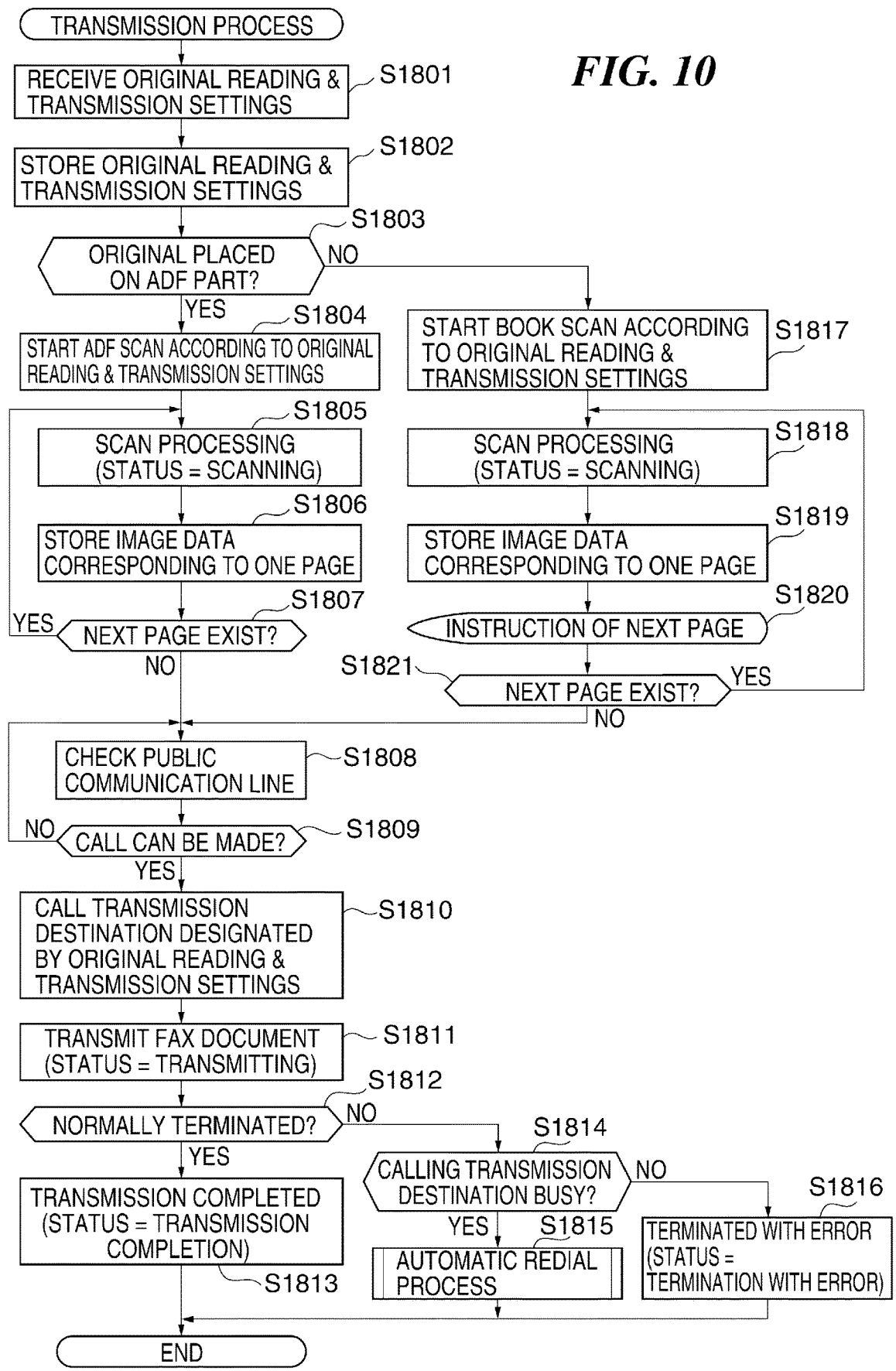
FIG. 10 is a flowchart of a transmission process executed in a step in FIG. 7.

FIG. 10 is a flowchart of the transmission process executed in the step S1322 in FIG. 7.

Referring to FIG. 10, the MFP 101 receives document reading and transmission settings including the settings of a transmission destination, a transmission source, document reading (scanning), etc. (step S1801), and stores the received settings (step S1802). The step S1801 corresponds to the operation of an instruction reception unit configured to receive from the mobile terminal an instruction for reading an original to be transmitted by fax and transmitting the fax document, together with transmission destination information indicative of a transmission destination to which the fax document is to be transmitted and reading and transmission information concerning fax transmission and reading of the original.

Then, the CPU 301 determines whether or not an original has been set on the ADF part (step S1803). If it is determined in the step S1803 that an original has been set on the ADF part (YES to the step S1803), the CPU 301 starts ADF scan (scan from the ADF part) according to the original reading and transmission settings (step S1804).

Then, the CPU 301 executes scan processing (step S1805), and stores the scanned image data corresponding to one page (step S1806). The status of the MFP 101 in the step S1805 is "scanning".

Then, the CPU 301 determines whether or not there is a next page (step S1807). If it is determined in the step S1807 that there is a next page (YES to the step S1807), the CPU 301 returns to the step S1805.

On the other hand, if it is determined in the step S1807 that there is no next page (NO to the step S1807), the CPU 301 checks the public communication line (step S1808).

Then, the CPU 301 determines whether or not a call can be made (step S1809). If it is determined in the step S1809 that a call cannot be made (NO to the step S1809), the CPU 301 returns to the step S1808.

On the other hand, if it is determined in the step S1809 that a call can be made (YES to the step S1809), the CPU 301 calls the transmission destination designated by the setting of a transmission destination (step S1810), and performs fax transmission (step S1811). The status of the MFP 101 in the step S1811 is "transmitting".

Then, the CPU 301 determines whether or not fax transmission has been normally terminated (step S1812). If it is determined in the step S1812 that fax transmission has been normally terminated (YES to the step S1812), the CPU 301 determines that the transmission is completed (step S1813), followed by terminating the present process. As the status of the MFP 101 in the step S1813, "transmission completion" is set.

On the other hand, if it is determined in the step S1812 that fax transmission has not been normally terminated (NO to the step S1812), the CPU 301 determines whether or not the telephone number of the calling transmission destination is busy (step S1814). If it is determined in the step S1814 that the telephone number of the calling transmission destination is busy (YES to the step S1814), the CPU 301 executes an automatic redial process for calling the number again (step S1815), followed by terminating the present process.

On the other hand, if it is determined in the step S1814 that the telephone number of the calling transmission destination is not busy (NO to the step S1814), the CPU 301 terminates fax transmission as an error (step S1816), followed by terminating the present process. As the status of the MFP 101 in the step S1816, "termination with error" is set. The steps S1813 and S1816 correspond to the operations of a status setting unit configured to set a status indicative of a result of transmission of the fax document.

Referring again to the step S1803 in FIG. 10, if it is determined in the step S1803 that an original has not been placed on the ADF part (NO to the step S1803), the CPU 301 starts book scan (scan from the platen part) according to the original reading and transmission settings (step S1817). The CPU 301 executes scan processing (step S1818), and stores the scanned image data corresponding to one page (step S1818). The steps S1805, S1818, and S1811 correspond to the operations of a fax document transmission unit configured to read the original according to the received reading and transmission information, and transmit the fax document representative of the original to a transmission destination indicated by the transmission destination information, according to the reading and transmission information.

When the scanned image data corresponding to one page has been stored, the CPU 301 displays an instruction for reading the next original (step S1820), and determines whether or not there is a next page (step S1821).

If it is determined in the step S1821 that there is a next page (YES to the step S1821), the CPU 301 returns to the step S1818.

If it is determined in the step S1821 that there is no next page (NO to the step S1821), the CPU 301 proceeds to the step S1808.

Figure 11:
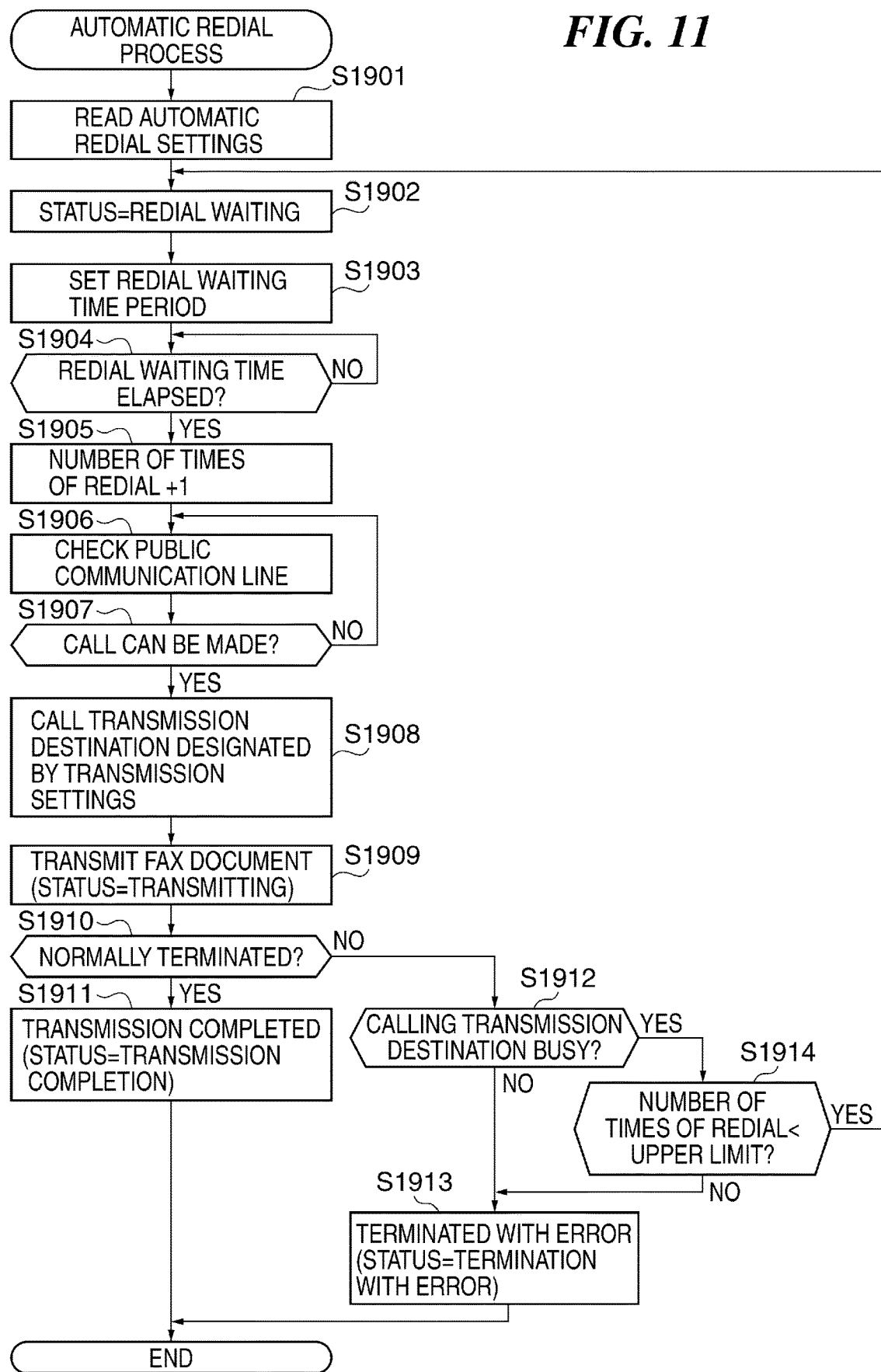
FIG. 11 is a flowchart of an automatic redial process executed in a step in FIG. 10.

FIG. 11 is a flowchart of the automatic redial process executed in the step S1815 in FIG. 10.

Referring to FIG. 11, the CPU 301 of the MFP 101 reads settings of the automatic redial set in advance (step S1901), sets the status of the MFP 101 to "redial waiting" (step S1902), and sets a redial waiting time period (step S1903).

When the redial waiting time period has elapsed (YES to a step S1904), the CPU 301 increments the number of times of redialing by one (step S1905), and checks the public communication line (step S1906).

Then, the CPU 301 determines whether or not a call can be made (step S1907). If it is determined in the step S1907 that a call cannot be made (NO to the step S1907), the CPU 301 returns to the step S1906.

On the other hand, if it is determined in the step S1907 that a call can be made (YES to the step S1907), the CPU 101 calls the transmission destination designated by the setting of a transmission destination (step S1908), and performs fax transmission (step S1909). The status of the MFP 101 in the step S1909 is "transmitting".

Then, the CPU 301 determines whether or not fax transmission has been normally terminated (step S1910). If it is determined in the step S1910 that fax transmission has been normally terminated (YES to the step S1910), the CPU 301 determines that the transmission is completed (step S1911), followed by terminating the present process. The status of the MFP 101 in the step S1911 is "transmission completion".

On the other hand, if it is determined in the step S1910 that fax transmission has not been normally terminated (NO to the step S1910), the CPU 301 determines whether or not the telephone number of the calling transmission destination is busy (step S1912).

If it is determined in the step S1912 that the telephone number of the calling transmission destination is not busy (NO to the step S1912), the CPU 301 terminates fax transmission as an error (step S1913), followed by terminating the present process. The status of the MFP 101 in the step S1913 is "termination with error".

On the other hand, if it is determined in the step S1912 that the telephone number of the calling transmission destination is busy (YES to the step S1912), the CPU 301 determines whether or not the number of times of redialing is less than a upper limit number (step S1914).

If it is determined in the step S1914 that the number of times of redialing is less than the upper limit number (YES to the step S1914), the CPU 301 returns to the step S1902.

On the other hand, if it is determined in the step S1914 that the number of times of redialing is not less than the upper limit number (NO to the step S1914), the CPU 301 proceeds to the step S1913.

Figure 12:
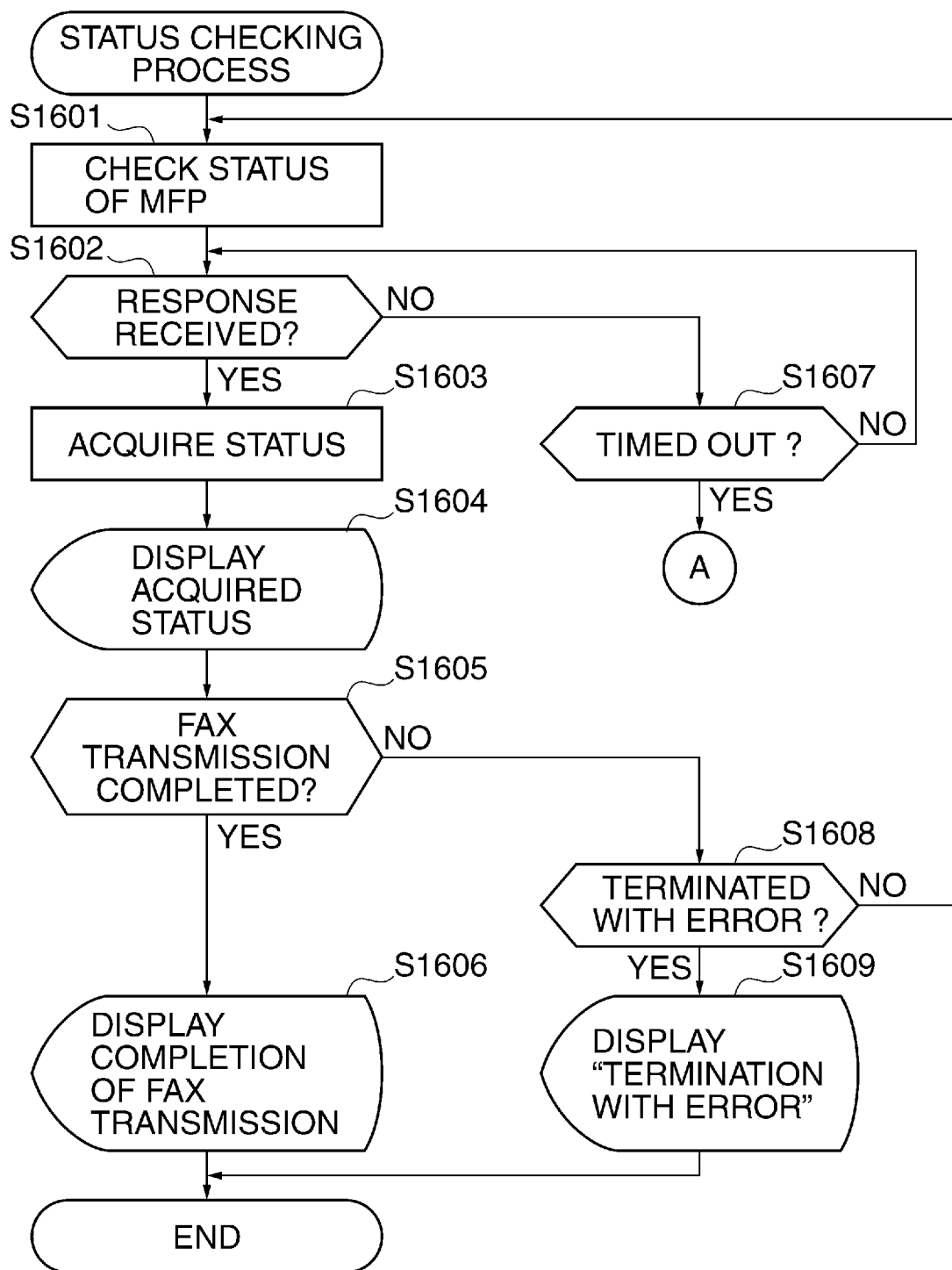
FIG. 12 is a flowchart of a status checking process executed in a step in FIG. 7.

FIG. 12 is a flowchart of the status checking process executed in the step S1313 in FIG. 7.

Referring to FIG. 12, the CPU 401 of the mobile terminal 102 checks the status of the MFP 101 (step S1601), and determines whether or not a response has been received (step S1602).

If it is determined in the step S1602 that no response has been received (NO to the step S1602), the CPU 401 determines whether or not the request has timed out (step S1607). If it is determined in the step S1607 that the request has not timed out (NO to the step S1607), the CPU 401 returns to the step S1602.

On the other hand, if it is determined in the step S1607 that the request has timed out (YES to the step S1607), as indicated by a connector A, the CPU 401 proceeds to the step S1511 in FIG. 9.

Referring again to the step S1602, if it is determined in the step S1602 that a response has been received (YES to the step S1602), the CPU 401 acquires the status of the MFP 101 from the received response (step S1603).

Next, the CPU 401 displays the acquired status of the MFP 101 on the display section 406 of the mobile terminal 102 (step S1604). More specifically, the CPU 401 displays the status, such as "dialing", "transmitting" or the like.

Then, the CPU 401 determines whether or not fax transmission is completed (step S1605). If it is determined in the step S1605 that fax transmission is completed (YES to the step S1605), the CPU 401 displays a message on the display section 406 of the mobile terminal 102 to the effect that the fax document has been transmitted (step S1606), followed by terminating the present process.

On the other hand, if it is determined in the step S1605 that fax transmission has not been completed (NO to the step S1605), the CPU 401 determines whether or not fax transmission has been terminated with an error (step S1608). If it is determined in the step S1608 that fax transmission has not been terminated with an error (NO to the step S1608), the CPU 401 returns to the step S1601.

On the other hand, if it is determined in the step S1608 that fax transmission has been terminated with an error (YES to the step S1608), the CPU 401 displays a message that fax transmission has been terminated with an error on the display section 406 of the mobile terminal 102 (step S1609), followed by terminating the present process. The steps S1606 and S1609 correspond to the operations of a transmission result-displaying unit configured to display a result of transmission of the fax document by the image forming apparatus, on the display section 406.

As described above, in the status checking process, the transmission result is displayed according to a status indicative of a transmission result acquired from the image forming apparatus. Further, if the answer to the question of the step S1607 is negative (NO), i.e. if the status cannot be acquired, the CPU 401 proceeds to the step S1511 in FIG. 9 as indicated by the connector A, to display a message to the effect that a response from the image forming apparatus cannot be obtained.

In the processes described above, the description is given assuming that the MFP 101 is equipped with the NFC tag 106. However, the MFP 101 may be configured to be equipped with no NFC tag 106 and/or the mobile terminal 102 may be configured to be equipped with no NFC controller 413.

FIG. 13 is a flowchart of a variation of the basic process shown in FIG. 7, which is executed by the MFP 101 and the mobile terminal 102 without using an NFC function.

The following description is given mainly of different points from the basic process described hereinabove with reference to FIG. 7. First, the steps S1401 to S1403 are the same as the steps S1301 to S1303 of FIG. 7.

When the next button 806 is pressed on the setting screen, the CPU 401 of the mobile terminal 102 proceeds to selection of an MFP (step S1404).

In this variation, it is assumed that at least one of the mobile terminal 102 and the MFP 101 is not equipped with the NFC function and hence it is impossible to perform short-range wireless communication by NFC. Therefore, instead of using the NFC function, the mobile terminal 102 searches for an MFP connected to the LAN (specifically, directly or indirectly connected to the access point 103) (step S1405). This step S1405 corresponds to the operation of a search unit configured to search for image forming apparatuses with which the mobile terminal can communicate.

Next, the CPU 401 causes a list of MFPs found by the search to be displayed on the display section 406 of the mobile terminal 102 (step S1406). The step S1406 corresponds to the operation of a list display unit configured to display a list of image forming apparatuses found by the search on the display section.

After thus displaying the list, the CPU 401 causes a message to be displayed which prompts the user to select one of the MFPs which the user desires to cause to perform fax transmission (step S1407).

Next, similar to the step S1308 in FIG. 7, the CPU 401 causes a mobile fax request to be transmitted to the MFP selected by the user via the network 105 (step S1408). The following steps are the same as the step S1309 et seq. in FIG. 7. As described above, the image forming apparatus selected by the user from the displayed list of image forming apparatuses is set to the image forming apparatus to be used for fax transmission.

In the basic process described with reference to FIG. 13, an MFP which the user desires to use is selected from a list of MFPs connected to the LAN. Therefore, the user is required to cause the selected one of MFPs in the list to match the MFP which the user desires to use, without making a mistake. However, there can be a case where a user does not know the name of an MFP which the user desires to use, and hence it is difficult to select the desired MFP without making a mistake.

For this reason, if the user can select an MFP while being assured of one-to-one correspondence, by using NFC as in the basic process shown in FIG. 7, the user can select a desired MFP, without making a mistake, even in a case where the user does not know the name of the MFP.

In this case, however, there is a demerit that the provision of the NFC tag 106 in the MFP 101 increases the manufacturing cost of the MFP 101. Further, there can be a case where the mobile terminal 102 is not equipped with the NFC function. As a solution to the demerit and inconvenience, the basic process in FIG. 13 is proposed.

As described heretofore, even in a case where an MFP small in a display section is used to transmit a fax document to a contact of which information is stored in a mobile terminal, it is possible to make not only a setting of the contact, but also various transmission settings, and hence it is possible to solve the problem of low operability.

Further, it is possible to make reading and transmission information concerning fax transmission and reading of an original to be transmitted by fax (see FIG. 5A), and hence it is possible to improve the operability of the mobile terminal for fax transmission.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-128529 filed Jun. 19, 2013 which is hereby incorporated by reference herein in its entirety.

What is claimed is:

1. A non-transitory computer-readable storage medium storing a program for causing a mobile terminal that receives connection information by a short range wireless communication from an apparatus having a scanning function for scanning an image of a document, generating image data based on the image and transmitting the generated image data to execute a method, the method comprising:
   displaying, by receiving from a user a user instruction for fixing a setting to be used in the scanning function, information that prompts the user to touch the mobile terminal to the apparatus; and
   transmitting the setting to the apparatus by a wireless communication different from the short range wireless communication, the wireless communication being established using the received connection information.

2. The non-transitory computer-readable storage medium according to claim 1,
   wherein a destination where the generated image data is transmitted by the scanning function is a destination included in the setting.

3. The non-transitory computer-readable storage medium according to claim 1,
   wherein the setting includes a scan setting.

4. The non-transitory computer-readable storage medium according to claim 1,
   wherein the received connection information is an IP address of the apparatus.

5. The non-transitory computer-readable storage medium according to claim 1,
   wherein a screen for receiving the setting to be used in the scanning function is displayed on the mobile terminal before the mobile terminal communicates with the apparatus by the short range wireless communication.

6. The non-transitory computer-readable storage medium according to claim 1,
   wherein the received connection information is received by the mobile terminal when the mobile terminal is touched to the apparatus in a state that the information is displayed on the mobile terminal.

7. The non-transitory computer-readable storage medium according to claim 1,
   wherein the short range wireless communication means a wireless communication that has a shorter range than the wireless communication different from the short range wireless communication.

8. The non-transitory computer-readable storage medium according to claim 1,
   wherein the user instruction for fixing the setting to be used in the scanning function is a user instruction for selecting an object for fixing the setting.

9. The non-transitory computer-readable storage medium according to claim 1,
   wherein the short range wireless communication is a communication using a NFC tag.

10. A non-transitory computer-readable storage medium storing a program for causing a mobile terminal that receives connection information by a short range wireless communication from an apparatus having a scanning function for scanning an image of a document, generating image data based on the image and transmitting the generated image data to execute a method, the method comprising:
    displaying, by receiving from a user a user instruction for fixing a setting to be used in the scanning function, information that it is needed to position the mobile terminal close to the apparatus; and
    transmitting the setting to the apparatus by a wireless communication different from the short range wireless communication, the wireless communication being established using the received connection information.

11. A non-transitory computer-readable storage medium storing a program for causing a mobile terminal that receives connection information by a short range wireless communication from an apparatus having a scanning function for scanning an image of a document, generating image data based on the image and transmitting the generated image data to execute a method, the method comprising:
    displaying, after receiving from a user a setting to be used in the scanning function, information that prompts the user to touch the mobile terminal to the apparatus; and
    transmitting the received setting to the apparatus by a wireless communication different from the short range wireless communication, the wireless communication being established using the received connection information.

12. The non-transitory computer-readable storage medium according to claim 11,
    wherein a destination where the generated image data is transmitted by the scanning function is a destination included in the received setting.

13. The non-transitory computer-readable storage medium according to claim 11,
    wherein the received setting includes a scan setting.

14. The non-transitory computer-readable storage medium according claim 11,
    wherein the received connection information is an IP address of the apparatus.

15. The non-transitory computer-readable storage medium according to claim 11,
wherein a screen for receiving the setting to be used in the scanning function is displayed on the mobile terminal before the mobile terminal communicates with the apparatus by the short range wireless communication.

16. The non-transitory computer-readable storage medium according to claim 11,
wherein the received connection information is received by the mobile terminal when the mobile terminal is touched to the apparatus in a state that the information is displayed on the mobile terminal.

17. The non-transitory computer-readable storage medium according to claim 11,
wherein the short range wireless communication means a wireless communication that has a shorter range than the wireless communication different from the short range wireless communication.

18. The non-transitory computer-readable storage medium according to claim 11,
wherein the short range wireless communication is a communication using a NFC tag.

19. A method executed by a mobile terminal that receives connection information by a short range wireless communication from an apparatus having a scanning function for scanning an image of a document, generating image data based on the image and transmitting the generated image data, the method comprising:
displaying, by receiving from a user a user instruction for fixing a setting to be used in the scanning function, information that prompts the user to touch the mobile terminal to the apparatus; and
transmitting the setting to the apparatus by a wireless communication different from the short range wireless communication, the wireless communication being established using the received connection information.

20. The method according to claim 19,
wherein a destination where the generated image data is transmitted by the scanning function is a destination included in the setting.

21. The method according to claim 19,
wherein the setting includes a scan setting.

22. The method according to claim 19,
wherein the received connection information is an IP address of the apparatus.

23. The method according to claim 19,
wherein a screen for receiving the setting to be used in the scanning function is displayed on the mobile terminal before the mobile terminal communicates with the apparatus by the short range wireless communication.

24. The method according to claim 19,
wherein the received connection information is received by the mobile terminal when the mobile terminal is touched to the apparatus in a state that the information is displayed on the mobile terminal.

25. The method according to claim 19,
wherein the short range wireless communication means a wireless communication that has a shorter range than the wireless communication different from the short range wireless communication.

26. The method according to claim 19,
wherein the user instruction for fixing the setting to be used in the scanning function is a user instruction for selecting an object for fixing the setting.

27. A method executed by a mobile terminal that receives connection information by a short range wireless communication from an apparatus having a scanning function for scanning an image of a document, generating image data based on the image and transmitting the generated image data, the method comprising:
displaying, by receiving from a user a user instruction for fixing a setting to be used in the scanning function, information that it is needed to position the mobile terminal close to the apparatus; and
transmitting the setting to the apparatus by a wireless communication different from the short range wireless communication, the wireless communication being established using the received connection information.

28. A method executed by a mobile terminal that receives connection information by a short range wireless communication from an apparatus having a scanning function for scanning an image of a document, generating image data based on the image and transmitting the generated image data, the method comprising:
displaying, after receiving from a user a setting to be used in the scanning function, information that prompts the user to touch the mobile terminal to the apparatus; and
transmitting the received setting to the apparatus by a wireless communication different from the short range wireless communication, the wireless communication being established using the received connection information.

29. The method according to claim 28,
wherein a destination where the generated image data is transmitted by the scanning function is a destination included in the received setting.

30. The method according to claim 28,
wherein the received setting includes a scan setting.

31. The method according claim 28,
wherein the received connection information is an IP address of the apparatus.

32. The method according to claim 28,
wherein a screen for receiving the setting to be used in the scanning function is displayed on the mobile terminal before the mobile terminal communicates with the apparatus by the short range wireless communication.

33. The method according to claim 28,
wherein the received connection information is received by the mobile terminal when the mobile terminal is touched to the apparatus in a state that the information is displayed on the mobile terminal.

34. The method according to claim 28,
wherein the short range wireless communication means a wireless communication that has a shorter range than the wireless communication different from the short range wireless communication.

35. The non-transitory computer-readable storage medium according to claim 28,
wherein the short range wireless communication is a communication using a NFC tag.

* * * * *